Feb. 2, 1926.

A. MILLER

MEASURING INSTRUMENT

Filed August 1, 1925

1,571,596

Inventor
A. Miller
By Clarence A. O'Brien
Attorney

Patented Feb. 2, 1926.

1,571,596

UNITED STATES PATENT OFFICE.

ANNA MILLER, OF DALLAS, TEXAS.

MEASURING INSTRUMENT.

Application filed August 1, 1925. Serial No. 47,591.

*To all whom it may concern:*

Be it known that I, ANNA MILLER, a citizen of the United States, residing at Dallas, in the county of Dallas and State of Texas, have invented certain new and useful Improvements in a Measuring Instrument, of which the following is a specification.

The present invention relates to a measuring instrument and has for its principal object to combine the features of an ordinary tape measure and rule and to also provide such a combined structure wherein the elements cooperate in that the rule functions as a plumb, weight or the like for the tape so that the tape may be held taut by holding one end only.

Another important object of the invention is to provide a measuring instrument of this nature which is exceedingly simple in construction, strong, durable, efficient and reliable in use, and otherwise well adapted to the purpose for which is is designed.

With the above and numerous other objects in view, as will appear as the description proceeds, the invention resides in certain novel features of construction, and in the combination and arrangement of parts as will be hereinafter more fully described and claimed.

In the drawing:—

Figure 1:
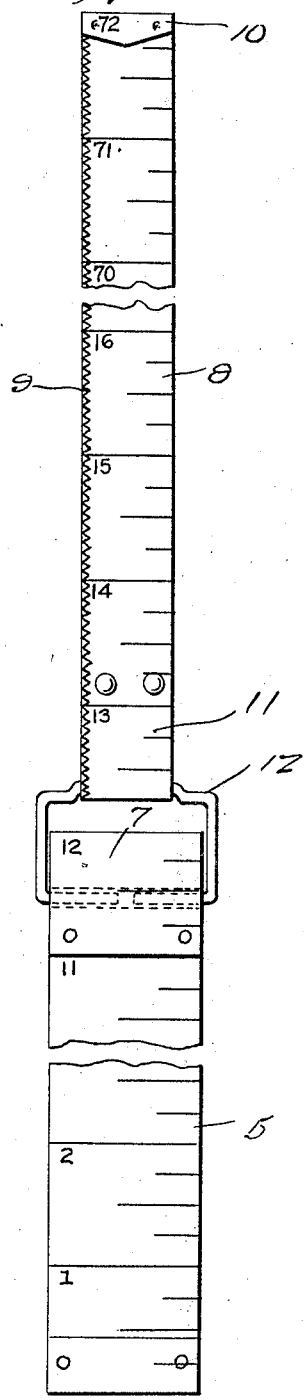
Figure 1 is a plan view of the instrument embodying the features of my invention.
Figure 3:
Figure 3 is a section through the tape portion thereof.
Figure 2:
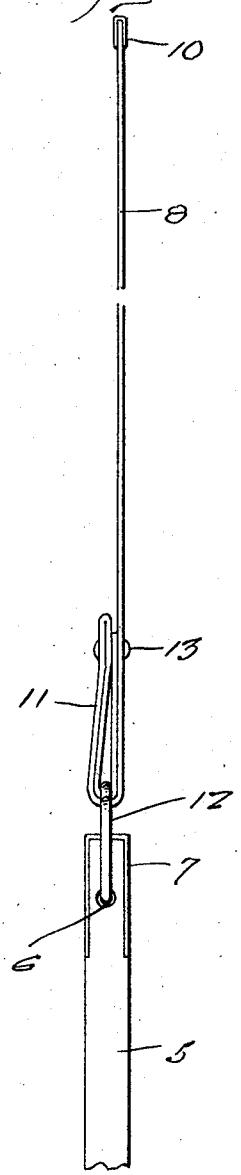
Figure 2 is an edge elevation thereof.

Referring to the drawing in detail it will be seen that 5 designates a rule constructed of some suitable rigid material such as wood or the like. At one end of the rule 5 there is provided a transversely extending opening 6. A tip 7 of suitable construction is placed over this end of the rule for strengthening the same. A tape 8 of suitable flexible material is constructed by folding the same over upon itself along two longitudinal dimensions so as to provide a three-ply structure which is held folded by an edge chain stitch 9. One end of the tape is provided with a tip 10. The other end of the tape is folded over upon itself as is indicated at 11 and then looped about the intermediate portion of a clevis or coupling 12, the loop being completed by suitable rivets 13 or other fastening elements. The ends of the clevis 12 extend into the opening 6 so that the clevis may swing in relation to the rule.

The rule and tape are provided with suitable indicia indicating inches or the like and the rule is of sufficient length so that it may be utilized as a plumb, weight or the like in holding the tape 8 taut. It will be apparent that this measuring instrument may be sued in numerous different ways. One way of using the device is in making vertical measurements such as done by a tailor in that the tip end 10 of the tape may be placed at a desired point on a person and the rule 9 will function as a plumb. It will be apparent, of course, that any intermediate portion of the tape may be held and the rule suspended as a plumb. It will further be seen that in measuring cloth on a counter or the like the rule may be allowed to extend over the counter and only one end of the tape need be held as the rule will function as a weight and hold the tape taut.

The present embodiment of the invention and its use have merely been given by way of example since in actual practice this embodiment attains all the features of advantage enumerated as desirable in the statement of the invention and the above description. It will be apparent that numerous changes in the details of construction, in the materials, and in the combination and arrangement of parts may be resorted to without departing from the spirit or scope of the invention as hereinafter claimed or sacrificing any of its advantages.

Having thus described my invention what I claim as new is:—

1. A measuring instrument of the class described including a rigid rule, a coupling pivotally engaged with one end of the rule, a tape looped at one end about the coupling, said tape being formed of flexible material folded over upon itself along two spaced longitudinally dimensions so as to provide a three-ply structure.

2. A measuring instrument of the class described including a rigid rule, a coupling pivotally engaged with one end of the rule, a tape looped at one end about the coupling, said tape being formed of flexible material folded over upon itself along two spaced longitudinally dimensions so as to provide a three-ply structure, one edge of tape being provided with a chain stitch to hold the plies together.

In testimony whereof I affix my signature.

ANNA MILLER.